United States Patent Office 3,565,874
Patented Feb. 23, 1971

3,565,874
NOVEL TERPOLYAMIDES
James S. Ridgway, Pensacola, Fla., assignors to Monsanto Company, St. Louis, Mo., a corporation of Delaware
No Drawing. Filed Aug. 8, 1968, Ser. No. 751,068
Int. Cl. C08g 20/20
U.S. Cl. 260—78
2 Claims

ABSTRACT OF THE DISCLOSURE

Terpolyamides are made from hexamethylene diamine salts of adipic acid, 1,1,3-trimethyl-5 carboxy-3(p-carboxylphenyl)indan and 1,4-cyclohexane dicarboxylic acid. Filaments made from such terpolyamides are useful in reinforcing pneumatic tires and the like.

BACKGROUND OF THE INVENTION

Polyamides, such as polyhexamethylene adipamide (nylon 66) and polymeric 6-amino caproic acid (nylon 6), are well known in the art and have found significant commercial success both as textile fibers and as reinforcing fibers, such as tire cord. Although the textile fibers obtained from the previously known fiber-forming polyamides are of great value, much research effort is being continuously expended in order to improve their properties. While previously known polyamides have found wide use in the reinforcement of rubber articles, such as vehicle tires, an inherent drawback in their use to reinforce vehicle tires is their tendency to flatspot. Flatspotting is a term used to describe the temporary out-of-roundness that occurs when a polyamide reinforced vehicle tire is allowed to rest for an extended period of time. That portion of the tire which is in contact with the ground becomes very slightly flattened and, when the vehicle is put in motion again, this flat spot causes a bothersome vibration of the vehicle for a short period of time. While the exact cause of flatspotting is not fully understood, it is recognized that the modulus of known polyamides is adversely affected by heat and moisture and that low modulus or loss of modulus under these conditions results in more pronounced flatspotting. Hence, it has long been a need in the art to have a polyamide yarn whose modulus is not significantly reduced by heat and moisture.

SUMMARY OF INVENTION

The present invention provides a novel linear fiber-forming copolyamide composed of:
(a) 50–98 mole percent of:

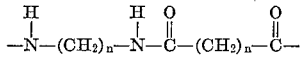

wherein $n$ is any integer of 2–12;
(b) 49–1 mole percent of:

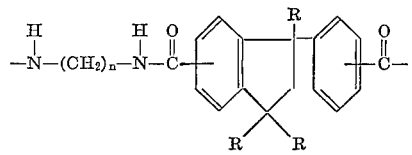

wherein $n$ is an integer of 2–12 and R is selected from any of members of the group consisting of hydrogen and saturated aliphatic groups containing 1 to 3 carbon atoms; and (c) 49–1 mole percent of:

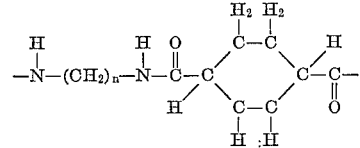

wherein $n$ is an integer of 2–12.

In a typical preparation the terpolymers are formed by subjecting to polyamide forming conditions the polymethylene diamine salts of an aliphatic dicarboxylic acid, phenylindan dicarboxylic acid and cyclohexane dicarboxylic acid. After a polymer having the desired molecular weight is made, it is extruded into filaments. The filaments are subjected to orientation draw to provide optimum tenacity. Instead of proceeding directly to the filament formation from the polymer formation, one, of course, can solidify the polymer and then melt extrude the remelted polymer. The polymethylene diamine salt of an aliphatic dicarboxylic acid is sufficient to provide 50–98 mole percent and preferably 60–90 percent thereof in the resulting terpolymer. The polymethylene diamine salt of phenylindan dicarboxylic acid is present during polycondensation in an amount sufficient to provide a 49–1 mole percent and preferably 10–5 mole percent thereof in the resulting terpolymer. The polymethylene diamine salt of cyclohexane dicarboxylic acid is present during polycondensation in an amount sufficient to provide 49–1 mole percent and preferably 30–5 mole percent thereof in the resulting terpolymer.

The terpolymers are prepared by procedures well known in the art and commonly employed in the manufacture of less complex polyamides. That is, the reactants are heated at a temperature of from 180° C. to 300° C. and preferably from 200° C. to 295° C. until the product has a sufficiently high molecular weight to exhibit fiber-forming properties, which properties are reached when the copolyamide has an intrinsic viscosity of at least 0.4. The reaction can be conducted at superatmospheric, atmospheric, or subatmospheric pressure. Often it is desirable, especially in the last stage of the reaction, to employ conditions, e.g., reduced pressure, which will aid in the removal of the reaction by-products. Preferably, the reaction is carried out in the absence of oxygen, for example, in an atmosphere of nitrogen.

Intrinsic viscosity as employed herein is defined as $$\lim_{C \to 0} \left( \frac{\log_e \eta_r}{C} \right)$$

in which $\eta_r$ is the relative viscosity of a dilute solution of the polymer in m-cresol in the same units at the same temperature and C is the concentration in grams of polymer per 100 cc. of solution.

Typical polymethylene diamine salts of an aliphatic dicarboxylic acid coming within the scope of the present invention include hexamethylene diammonium adipate, hexamethylene diammonium sebacate, hexamethylene diammonium suberate, octamethylene diammonium adipate, decamethylene diammonium adipate, pentamethylene diammonium sebacate, dodecamethylene diammonium adipate, hexamethylene diammonium azelate, dodecamethylene diammonium suberate, hexamethylene diammonium glutarate, hexamethylene diammonium succinate, decamethylene diammonium adipate, heptamethylene diammonium glutarate, 2,3-dimethyl-hexamethylene diammonium adipate and others.

The polymethylene diamine salts of phenylindan dicarboxylic acid include those salts formed from diamines having 2–12 repeating methylene units and phenylindan dicarboxylic acids represented by the following formula:

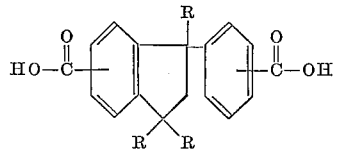

wherein R is as defined above. Typical suitable compounds falling within this formula are: 3-(4-carboxyphenyl)-5-indan carboxylic acid; 3-(3-carboxyphenyl)-5-indan carboxylic acid; 3-(4-carboxyphenyl)-1,1,3-trimethyl-5-indan carboxylic acid; 3-(3-carboxyphenyl)-1,1,3-triethyl-6-indan carboxylic acid; 3 - (4 - carboxyphenyl) - 1-methyl- 1,3 - dipropyl-5-indan carboxylic acid; 3-(4-carboxyphenyl)-1-methyl-1,3-diethyl-6-indan carboxylic acid, and the like. The preferred phenylindan dicarboxylic acid for the preparation of the copolyamides of this invention is 3-(4-carboxyphenyl)-1,1,3-trimethyl-5-indan carboxylic acid which is represented by the formula:

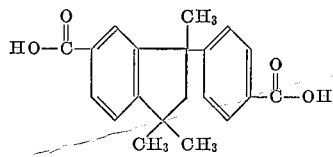

The polymethylene diamine salts of 1,4-cyclohexane dicarboxylic acid include those salts formed from diamines having 2–12 repeating methylene units and 1,4-cyclohexane dicarboxylic acid which can be in the cis isomeric form, trans isomeric form, or mixtures thereof. Evidence indicates that during the polycondensation substantially all of the cis isomers convert to the trans form.

DESCRIPTION OF THE PREFERRED EMBODIMENTS

In Examples 1–7, polymers were prepared having the indicated mole percent of components. 66 represents hexamethylene diammonium adipate. 6CDA represents the salt of hexamethylene diamine and 1,4-cyclohexane dicarboxylic acid. 6PDA represents the salt of hexamethylene diamine and 1,1,3-trimethyl-5-carboxy-3-(p-carboxyphenyl)indan. In each example the amount of each component employed was determined by its desired mole percentage in the terpolymer. Various salts whose compositions are given below in Table I were dissolved in water and the resulting solution was placed in a stainless steel, high pressure autoclave previously purged with nitrogen. The temperature and pressure within the autoclave were slowly raised until values of 220° C. and 250 p.s.i.g., respectively, were reached. The temperature was then further increased to 243° C. while the pressure was maintained at 250 p.s.i.g. by removal of steam condensate. The pressure was then gradually reduced to atmospheric over a 25-minute period. The temperature was allowed to level at 20° C. above the melting point where the polymer formation continued for 30 minutes, the minimum temperature employed being 280° C. The polymer was melt spun directly from the bottom of the autoclave to yield a monofilament yarn having excellent textile properties after being molecularly drawn. Samples of the yarns were conditioned at 30° C. with relative humidities of 0% and 30%. Sonic modulus values for these samples were determined. The humidity conditions were maintained but the temperature of the yarn was raised by the increments shown in Tables II and III. Sonic modulus values were determined for the various samples at these temperature increments.

Sonic modulus was determined by the pulse propagation technique described in the Textile Research Journal, volume 29, page 525 (1959). Sonic modulus is defined therein in terms of grams per denier as equalling 11.3 times $C^2$ in which C is the velocity of sound in the polymer measured in kilometers per second. The sonic modulus values were measured at the given temperature and relative humidity and at a frequency of 14 kilocycles per second with 60 pulses per second while the filaments were under a low tension of 0.03 gram/denier.

The reduced adverse effect on modulus values of filaments of the present invention with higher temperatures and relative humidities is shown in Tables II and III.

TABLE I

| Polymer | M% 66 | M% 6CDA | M% 6PDA | Melting point, °C.[1] | Viscosity | Tenagty, g./d. |
|---|---|---|---|---|---|---|
| 1 | 90 | 5 | 5 | 262 | 0.98 | 6.9 |
| 2 | 85 | 10 | 5 | 272 | 0.83 | 6.6 |
| 3 | 80 | 10 | 10 | 261 | 0.93 | 5.1 |
| 4 | 80 | 15 | 5 | 277 | 0.96 | 6.7 |
| 5 | 75 | 20 | 5 | 287 | 0.96 | 5.3 |
| 6 | 70 | 20 | 10 | 285 | 0.77 | 5.4 |
| 7 | 100 | 0 | 0 | 262 | 1.01 | 6.0 |

[1] Average of range.

TABLE II.—0% RELATIVE HUMIDITY

| Polymer | Sonic modulus, g./d. at 30° C. | Percent modulus retained at— | | | | |
|---|---|---|---|---|---|---|
| | | 50° C. | 80° C. | 110° C. | 130° C. | 150° C. |
| 1 | 47.5 | 96 | 83 | 72 | 61 | 42 |
| 2 | 47.5 | 93 | 83 | 76 | 63 | 45 |
| 3 | 43.0 | 95 | 88 | 80 | 68 | 49 |
| 4 | 47.5 | 91 | 83 | 76 | 67 | 49 |
| 5 | 45.2 | 93 | 87 | 78 | 70 | 57 |
| 6 | 43.0 | 91 | 88 | 80 | 74 | 58 |
| 7 | 59.3 | 94 | 80 | 63 | 54 | 33 |

TABLE III.—30% RELATIVE HUMIDITY

| Polymer | Sonic modulus, g./d. at 30° C. | Percent modulus retained at— | | | |
|---|---|---|---|---|---|
| | | 45° C. | 60° C. | 75° C. | 90° C. |
| 1 | 47.5 | 88 | 83 | 76 | 67 |
| 2 | 47.5 | 91 | 83 | 76 | 64 |
| 3 | 45.2 | 90 | 85 | 79 | 70 |
| 4 | 47.5 | 91 | 83 | 76 | 69 |
| 5 | 47.5 | 91 | 83 | 76 | 69 |
| 6 | 47.5 | 91 | 83 | 79 | 72 |
| 7 | 75.2 | 83 | 70 | 57 | 48 |

The results set forth in the above tables shown the filaments of the present invention have better resistance to being adversely affected by heat and moisture. Tires made from the filament exhibit reduced flatspotting.

I claim:
1. A filament-forming polyamide consisting essentially of repeating units of the formula as follows:
  (a) 50–98 mole percent of

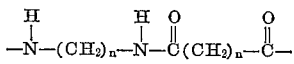

wherein $n$ is an integer of 2–12;
  (b) 49–1 mole percent of

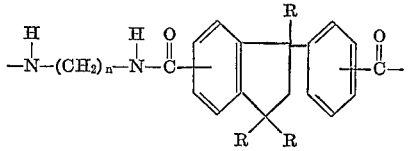

wherein $n$ is any integer of 2–12 and R is selected from the group consisting of hydrogen and saturated aliphatic hydrocarbon groups containing 1 to 3 carbon atoms; and
(c) 49–1 mole percent of
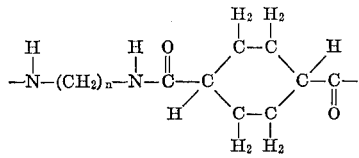
wherein $n$ is any integer of 2–12.
2. The terpolymer of claim 1 composed of 60–90 percent of (a) component, 10–5 percent of (b) component and 30–5 percent of (c) component.
References Cited
UNITED STATES PATENTS
| | | | |
|---|---|---|---|
| 2,965,616 | 12/1960 | Caldwell et al. | 260—78 |
| 3,380,968 | 4/1968 | Ridgway | 260—78 |
| 3,383,368 | 5/1968 | Ridgway | 260—78 |
HAROLD D. ANDERSON, Primary Examiner
U.S. Cl. X.R.
57—140; 152—330; 161—168; 260—33.4